Aug. 16, 1938.   C. S. BRAGG   2,126,945
BRAKE DRUM
Filed Dec. 31, 1930   2 Sheets-Sheet 1
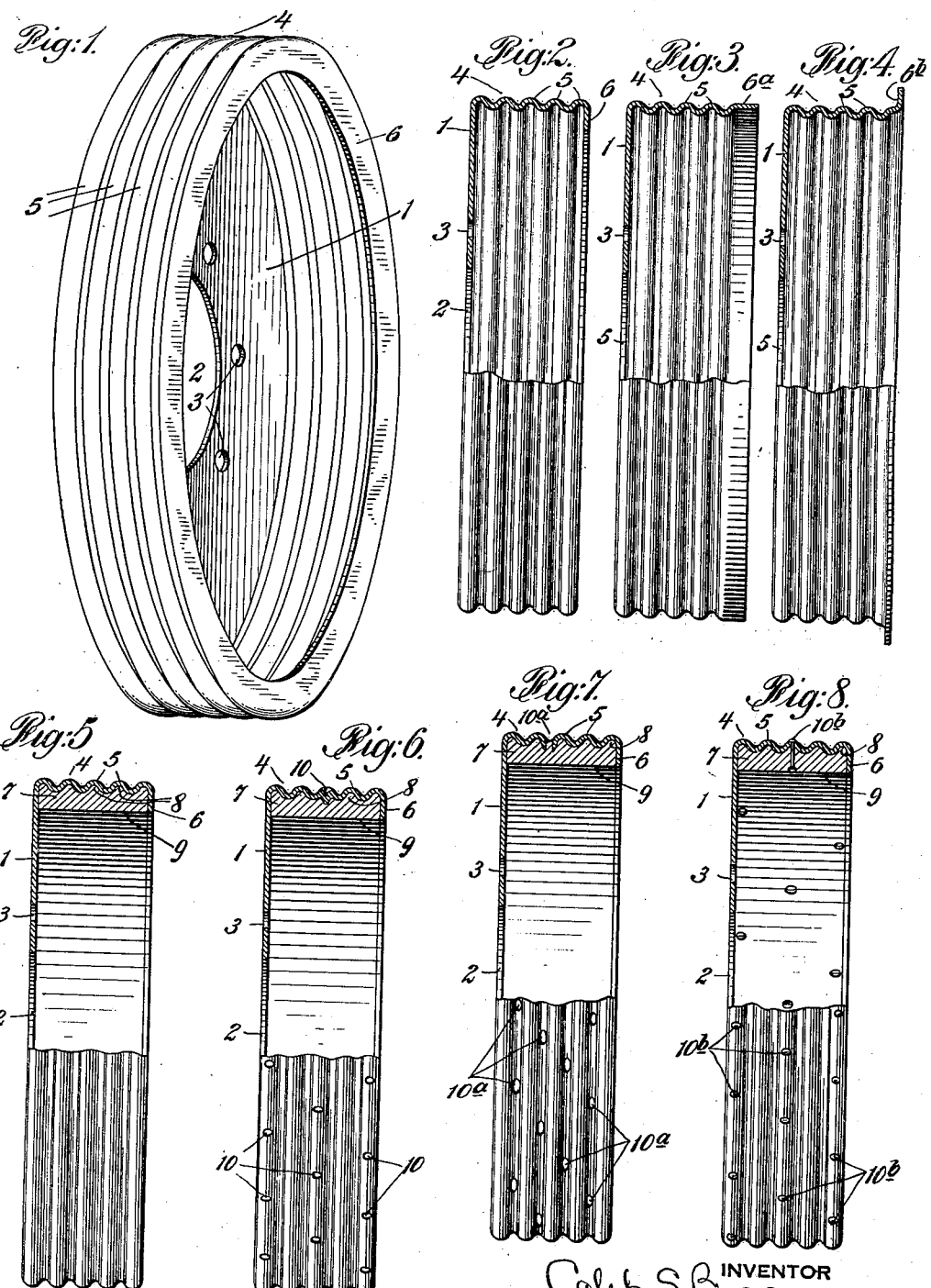
INVENTOR
Caleb S. Bragg
BY
Louis Trewood Whitaker
ATTORNEY

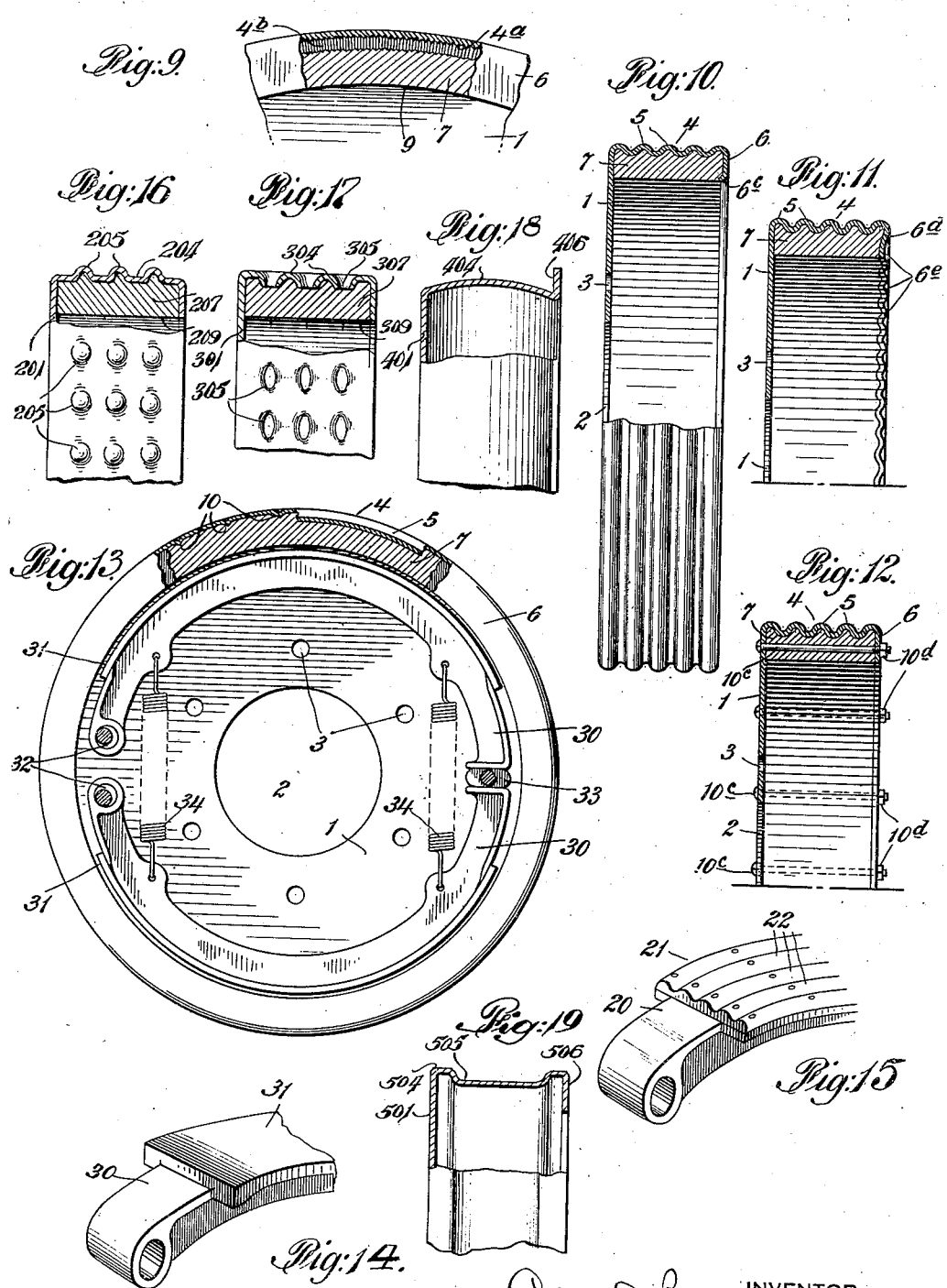

Patented Aug. 16, 1938

2,126,945

UNITED STATES PATENT OFFICE 2,126,945

BRAKE DRUM

Caleb S. Bragg, Palm Beach, Fla.

Application December 31, 1930, Serial No. 505,821

18 Claims. (Cl. 188—218)

My invention consists in the novel features hereinafter described, reference being had to the accompanying drawings, which illustrate several forms in which I have contemplated embodying my invention, selected by me for purposes of illustration, and the said invention is fully disclosed in the following description and claims.

My invention consists in a new friction element for use in brake mechanism or clutch mechanism for automotive vehicles, although it may be embodied in any other forms of friction apparatus for any purpose in which its use may be desirable.

My invention is particularly advantageous in brake mechanism for automotive vehicles, and especially in the construction of brake drums therefor.

Brake drums formed of sheet steel, stamped or pressed by suitable dies into final form with hub apertures and bolt holes, are used practically on all automotive vehicles except the very heavy models, on account of their lightness and low cost of manufacture. In order to form these drums by stamping or pressing, it is necessary to use a comparatively soft steel, with the result that the braking flanges of the drums are easily scored by frictional engagement with the other braking element, which is usually the brake shoes in the internal expanding type of brake mechanism, or a brake band in the external contracting type of brake mechanism, the former type being more usual as the latter type has been practically abandoned. It has been found that brake shoe pressures, which are otherwise practical, distort the flange into an oval shape, and it has also been found that the frictional heat developed in braking, tends to distort the braking flange of the drum, and in both cases appreciably reduce the area of frictional contact between the drum flange and the opposed braking element and increase the pressure on the remaining contact surfaces, which may cause excessive heat, wear and scoring. It has been proposed to form an angular reinforcing lip at the outer edge of the braking flange, but this does not prevent distortion of the flange between the lip and the body or disc of the drum. It has also been proposed to provide the flange with an exterior L or U shaped reinforcing band. This adds to the cost of manufacture of the drum, and also adds to the weight and does not entirely prevent the distortion of portions of the braking flange adjacent to the reinforcing band. The best forms of brake drums are forged or cast metal drums with reinforcing and radiating fins, which are carefully machined inside, and also on the outside, if the drums are to be correctly balanced, but the prices of these machined drums is prohibitive for the lighter automotive vehicles.

My invention consists primarily in a pressed brake drum of steel or other suitable material, in sheet or other form, having its annular braking flange distorted by bending, spaced or continuous, portions thereof while either hot or cold, into different spaced relation to the axis of revolution of the drum to increase the stiffness of the flange by forming projections or depressions, or punching apertures, or forming corrugations in the drum flange, which are disposed in lines extending circularly around the same. Where the drum is corrugated, the corrugations are preferably formed by bending portions of the flange alternately outwardly and inwardly, and preferably without thinning the metal of the flange. These corrugations or other distorted portions impart great strength and stiffness to the flange throughout its entire width to withstand all practical braking pressures, and also the highest temperatures to which it is likely to be subjected in use, without appreciable distortion. Obviously the number of corrugations will depend upon their size and shape with respect to the braking flange and its lips. Where it is desired that the other braking element shall directly come in frictional contact with the corrugated surface of the braking flange, said element, whether band or brake shoe, is provided with a friction surface corrugated to correspond exactly with the opposed surface of the braking flange of the drum, which in such case would be provided with circular and parallel corrugations extending perpendicularly to the axis of the drum. This arrangement, however, presents an objectionable feature in that it is difficult, if not impossible, to provide sufficient clearance between the opposed corrugated friction surfaces to permit the removal of the drum without disassembling the other elements of the brake mechanism. I prefer, therefore, to provide the distorted surface of the drum flange which is adjacent to the other braking element, with a friction lining having its flange engaging surface correspondingly distorted to fit the inequalities of the surface of the drum flange, and its inner face smooth and cylindrical, the said lining being secured to the braking flange of the drum against movement relatively thereto. This preferred embodiment of my invention has the advantage of permitting the use of the present types of coacting brake elements, i. e., brake shoes, which, however, preferably have metallic faces for engaging the cylindrical faces of the lining, and these metal surfaces, which may be integral with or secured to the shoes, may be made of as hard material as desired, so that scoring thereof will be largely obviated. Furthermore, the brake drum and co-acting brake element, or elements, can be readily assembled or separated in the usual manner.

In carrying out my invention, the corrugated or otherwise distorted braking flange of the drum may be provided at its outer edge with a marginal portion or lip, which may project inwardly or outwardly, and preferably to a considerably greater extent than the distorted portions of the flange, to further stiffen the flange, and serve to retain and protect the lining applied to the face of the flange. In some instances the lip may be allowed to extend cylindrically beyond the corrugated portions of the flange. The opposite edge of the annular drum flange is also provided with inwardly extending portions preferably in the form of an annular flange, which is provided with means for attaching the drum flange to a rotary part.

My invention also contemplates means for interlocking the lining with the corrugated or otherwise distorted braking flange for which purpose the flange may be provided, for example, with dents or projecting portions engaging corresponding recessed portions in the lining, or the reverse of this construction, or the lining and drum may be united by forming punched holes or perforations in the braking flange, in such manner that the projecting portions of the metal around such holes will extend into and interlock with the lining, and provide additional means for dissipating the heat of friction, or the flange and lining may be united by mechanical fastenings, as rivets, or the face of the flange adjacent to the lining may be knurled or roughened to engage and interlock with the lining, which in such case may be adhesively applied to the adjacent face of the flange, and further, where the drum is provided with a lip engaging the outer edge of the lining, this lip may be spun inwardly or crimped or compressed upon the lining, in any desired manner, or corrugated to assist in securing the lining to the drum. It will also be understood that the flange may be provided with a single outwardly or inwardly bent portion between its edges, extending entirely around the same, instead of a plurality of such bends forming corrugations, if desired.

Referring to the accompanying drawings, in which I have shown a number of embodiments of my invention, selected by me for purposes of illustration, Fig. 1 is a perspective view of one form of my improved brake drum.

Fig. 2 is an elevation of the same, partly in section.

Fig. 3 is a view similar to Fig. 2, showing a slight modification.

Fig. 4 is a similar view of another modification.

Fig. 5 is an elevation, partly in section, showing the drum illustrated in Figs. 1 and 2, with a molded lining applied to the inner surface of the drum flange.

Fig. 6 is a view similar to Fig. 5, showing a slight modification in which the drum flange is provided with projecting portions to interlock with the lining.

Fig. 7 is a similar view showing a further modification in which the drum flange is provided with punched holes, the marginal portions surrounding which interlock with the lining.

Fig. 8 is a similar view showing a further modification in which the lining is riveted to the braking flange.

Fig. 9 is a partial sectional view of a portion of the corrugated braking flange and lining, showing the inner surface of the flange knurled or roughened to interlock with the lining.

Fig. 10 is a view similar to Fig. 5, showing the edge of the lip spun or crimped over the outer edge of the lining.

Fig. 11 is a partial sectional view of the drum and lining showing the annular lip corrugated radially and engaging the outer edge of the lining.

Fig. 12 is a similar view showing the drum and lining united by transverse bolts extending through the lip and body of the drum.

Fig. 13 shows an elevation, partly in section of an internal expanding drum assembly illustrating a brake of the type illustrated in Fig. 6, in association with internal brake shoes having metallic friction surfaces.

Fig. 14 is a detail view of a portion of one of the brake shoes shown in Fig. 13.

Fig. 15 is a partial view of a brake shoe provided with a friction lining having a corrugated surface to directly engage the inner corrugated surface of the brake drum flange.

Fig. 16 is a partial view partly in section showing a modification of the drum in which the flange is provided with distorted portions in the form of annular rows of indentations extending outwardly with respect to the axis of the drum.

Fig. 17 is a similar view showing a drum in which the flange is provided with annular rows of punch holes or apertures.

Fig. 18 is a similar view showing the flange provided with a single annular outcurved portion.

Fig. 19 is a similar view showing the flange provided with a single annular incurved portion.

Referring to the form of brake drum illustrated in Figs. 1 and 2, I represents the attaching portion or body of the brake drum therein shown, which as illustrated is in the form of an annular flange extending inwardly from the inner edge of the braking flange, providing the central aperture, 2. The said attaching flange may, if desired, be provided with a circular series of bolt holes, 3, 3, as shown, (or other suitable means) whereby the drum may be attached to a wheel, hub or other rotary part, or it may be welded or attached in any other manner. 4 represents the annular braking flange, disposed substantially perpendicularly to the attaching flange or body, I, and having circularly extending portions bent alternately outwardly and inwardly to form circularly, parallel corrugations, 5, which in this instance are disposed in planes perpendicular to the axis of the drum. The outer edge of the braking flange, 4, is in this instance provided with an inwardly bent lip, 6, parallel to the attaching portion, I. It will be understood that any drum formed of sheet steel or other suitable sheet or wrought metal, may be stamped, pressed or rolled into the final form herein described, from a suitable blank without any machining. The drum may be first stamped in the usual manner to form the attaching portion, and the cylindrical flange portion. The central hub aperture and the bolt holes may be punched or formed before or after the formation of the braking flange, the hub aperture being coaxial with the flange, so that the drum may be centered and rotated by attaching it to a rotary hub. The corrugations may be subsequently formed in the flange by means of suitable opposed rollers or the like, and preferably successively from the edge adjacent to the attaching portion outwardly, to avoid thinning the metal of the flange, 4, after which the lip, 6, may be pressed or rolled or bent over into the position shown in Figs. 1 and 2, or the corrugations may be pressed or formed in any other desired way, and by any other desired means, as preferred. It will be readily understood that the circular corrugations, 5, formed in the braking flange, 4, will impart great strength and rigidity to the flange, which is further strengthened by the inturned lip, 6, so that, without materially increasing the weight of the drum, or thickness of the metal from which it is formed, the strength and rigidity of the flange is greately increased, so that it will resist all braking pressures as well as the heat of friction to which it may be subjected without appreciable distortion.

In Fig. 3 I have illustrated the same form of drum, the parts of which are indicated by the same reference numerals, the only difference being that in this figure the lip, indicated at 6a, extends cylindrically from the outer edge of the corrugated portion of the drum flange and parallel to the axis of said drum.

In Fig. 4 I have shown the same drum structure, the parts of which are indicated by the same reference numerals, except that the lip, indicated at 6b, is in this instance bent outwardly to be perpendicular to the axis of the drum, as shown.

As before stated, my improved brake drum may be used in such manner that one or other of the faces of the corrugated braking flange constitutes one of the friction faces of the brake mechanism, in which case the other braking element is preferably provided with a friction lining having a corrugated friction surface fitting and directly engaging the corrugated surface of the braking flange. In Fig. 15, for example, I have shown a portion of the brake shoe, 20, forming part of an internal expanding brake mechanism, provided on its outer face with a friction lining, indicated at 21, having its exterior friction face corrugated, as indicated at 22, to fit and engage the inner face of the corrugated friction flange, 4, of my improved brake drum of Fig. 3, for example. This construction is not claimed specifically herein as it forms the subject matter of another application, a division of this application filed by me on the 7th day of June, 1932, and given Serial Number 615,788. While this arrangement is entirely practicable, it presents the objectionable feature that the brake drum and brake shoes, the corrugated friction surfaces of which must necessarily have very little clearance in the off position of the brake, would prevent the drum from being removed from the shoes without disassembling the brake mechanism to a greater or less extent. I therefore prefer, as previously stated, to provide the corrugated braking flange of my improved drum with a friction lining, which is rigidly secured thereto, and provided with a smooth cylindrical friction surface.

In Fig. 5, for example, I have shown my improved brake drum of the form illustrated in Figs. 1 and 2, for example, provided with a molded or cast brake lining, indicated at 7, having its outer surface provided with the corrugated portions, 8, fitting the corrugated portions, 5, of the drum flange, 4, located between the lip, 6, and the attaching flange or body, 1, of the drum, and extending entirely around the inner face of the flange. The inner face, 9, of the lining is smooth, and when the lining is in place within the drum flange, it will provide a cylindrical friction surface to engage the brake shoes of an internal expanding brake mechanism. The lining, 7, may be formed of any suitable material, for example, asbestos combined with rubber, or Bakelite, with or without the inclusion of metallic wires or metallic particles, or any other brake lining material. The brake lining, of the molded or cast type, in which the various ingredients are brought together in more or less finely divided or liquid condition, and pressed or molded into the desired form, and subsequently hardened by heat or otherwise, may be formed in suitable lengths corresponding with the internal periphery of the drum flange, and inserted therein, and secured thereto, or the lining may be molded or cast and completely formed in situ, in proper relation to the drum, and provided with a friction surface coaxial with the axis of rotation of the drum, and hardened in position therein, in accordance with my improved process, which is covered by a separate application filed by me on or about January 10, 1931, and given Serial No. 507,905.

In some instances, especially where the lining is adhesively secured to the face of the braking flange, or is formed and hardened in situ, no additional fastening means may be inserted, although I prefer to press the lip, 6, of the drum flange in a direction toward the attaching flange, 1, thereof, so as to bring it firmly into contact with the lining and cause it to exert a clamping action laterally thereon all the way around the drum.

My invention, however, contemplates means for securing the lining against any possibility of movement with respect to the braking flange, and this may be accomplished in any one of a number of ways as shown by the examples given in the drawings. As indicated in Fig. 6, for instance, I have shown the corrugated braking flange provided with indentations, indicated at 10, or dents, on the exterior, producing corresponding projections on the inner face of the braking flange, 4, which become embedded in the lining, when the latter is pressed into position or formed in situ, either on the inside as shown, or on the outside, thus providing the lining and braking flange with interlocking portions, which will positively prevent the movement of the lining with respect to the drum, due to the frictional engagement of the shoes with the friction face of the lining.

Instead of the indented portions, 10, the braking flange may be provided with punched holes, as indicated at 10a, as shown in Fig. 7, in which case the jagged portions of the flange surrounding the holes will project into the lining while the apertures themselves permit access of air to the lining, thus facilitating the dissipation of frictional heat. If the lining is molded or cast in the drum, portions of the lining will extend into the apertures in the flange and interlock therewith.

In Fig. 8, I have shown the lining, 7, positively secured to the drum by mechanical fastenings in the form of rivets, 10b, which may be provided in any desired number and located at any desired intervals, as may be found advantageous. The rivets are preferably of copper to assist in radiating heat.

In some instances, especially where the lining is adhesively applied to the face of the braking flange, a sufficient interlocking or interengagement between the lining and the face of the corrugated braking flange which it engages may be obtained by simply roughening the face of the braking flange which the lining engages. Thus, in Fig. 9, for example, I have shown the inner face of the braking flange, 4a, provided with a roughened surface, as at 4b, which may be obtained by knurling the same by the use of a suitable knurling tool, or tools. The lining, indicated at 7, will be pressed cast or otherwise formed with its outer face in firm contact with the knurled interior face of the braking flange, with or without forming an adhesive contact between them, so as to interlock therewith, it being understood that, as in the other examples shown, the lining may be held from lateral movement by the attaching flange at one side and the drum lip on the other.

In some instances it is found desirable, after the lining has been applied to the braking flange between the disc and lip thereof, to spin, to compress or to crimp the inner edge of the lip over upon the adjacent portion of the lining to more securely fasten the lining within the rim. Thus, in Fig. 10, I have shown the inner edge of the lip, 6, of the braking flange shown in Figs. 1 and 2 and 5, spun compressed or crimped inwardly, as at 6c, upon the lining, 7, and it will be understood that this crimping of the rim may be resorted to with any or all of the forms of interlocking means between the corrugated rim and lining, such as are shown in Figs. 6, 7, 8 and 9, as desired.

In some instances, as shown for example, in Fig. 11, the entire lip, 6, of the drum may be corrugated either circularly or radially, which will have the effect of stiffening the lip and also providing portions to interlock with the outer edge portions of the lining. In Fig. 11, for example, I have shown the lip, here indicated at 6d, with corrugations, indicated at 6e, disposed radially with respect to the axis of the drum, and interlocking with the outer edge portions of the lining, 7, as clearly indicated in said figure.

In some instances the lining may be firmly secured with respect to the braking flange by means of bolts or rivets extending through the lining transversely thereof, and through the attaching flange or body and the inwardly projecting lip of the brake drum. In Fig. 12, for example, I have shown a brake drum of the same form as that illustrated in Figs. 1, 2 and 5, provided with the annular brake lining, 7, which is rigidly secured in position by means of a circular series of bolts, 10c, extending through the attaching flange or body, 1, of the drum through the lining 7, and through the lip, 6, and provided with nuts, 10d, by which they may be tightened so as to firmly clamp the lining between the lip and attaching flange or body of the drum. Where the lining 7, is formed in situ, the bolts, 10c, and nuts, 10d, can be placed in engagement with the drum before the formation of the lining, which will then be formed so as to entirely surround the bolts and firmly anchor the lining to the drum. Where the securing means extend transversely through the lining and through the lip, 6, and attaching flange or body, 1, of the drum, they will prevent the transverse expansion of the corrugated drum flange by the heat of friction and will also serve to assist in radiating heat. In addition these transversely disposed securing devices or bolts also serve in conjunction with the lining, to impart additional stiffness to the drum structure. This specific embodiment of my invention is not claimed herein as it forms the subject matter of a separate application, filed by me on the 7th day of June, 1932, and given Serial Number 615,786, which is a division of this application and which is now Patent No. 1,978,564, issued October 30, 1934.

In all forms of my improved brake drum and lining in which the contacting faces thereof are provided with interlocking portions, it will be noted that when the lining and braking flange are subjected to braking pressure from the opposed braking element, this pressure is exerted upon the lining in a direction toward the braking flange, so as to more firmly unite the interlocking portions of the flange and lining, and assist in preventing the possibility of any relative movement between the lining and the braking flange.

In Fig. 13 I have illustrated, in elevation partly in section, a complete brake assembly comprising the brake drum having a corrugated brake flange, 4, provided in this instance with the molded or cast lining, 7, the braking flange being provided with inwardly extending dents, 10, as in Fig. 6, forming projections on the inner face which interlock with the outer surface of the molded lining. 30—30 represents the usual expanding brake shoes, which may be of any desired construction and are provided with smooth friction surfaces, 31, to engage the molded friction lining, 7, of the corrugated braking flange. The friction surfaces of the shoes may be of any desired material, as for example metal and may be of any desired degree of hardness. The friction surfaces may be integral with the shoes or they may be in the form of linings of metal or other suitable material, secured to the shoes in any preferred or usual manner. In this instance each of the shoes is shown pivotally mounted at one end upon an eccentric pivot, 32, rigidly but adjustably secured to a supporting plate adapted to be bolted to a non-rotatable member in a well known manner, and the opposite ends of said shoes engage the usual expanding cam, 33, the said shoes being normally held in retracted position by springs, 34. The particular mounting and means for expanding the particular brake shoes form no part of my present invention. A portion of one of the shoes, detached, is illustrated in Fig. 14, and shows the friction surface, 31, of metal which may be made of as hard material as desired, so that the surfaces of the shoes, which may be the only metallic parts exposed to friction when the brake is applied, will not be subjected to material scoring or cutting, such as is the case where the metallic friction surface is on the drum, which must necessarily be of soft metal to permit it to be formed by stamping, as before described.

It is to be understood that the braking element, which is worn away by friction in use, may be either the lining of the drum or the brake shoes, or both, as preferred. If the lining is to receive the greater wear, the drum may be relined when necessary. If, on the other hand, the brake shoes are constructed so as to wear more rapidly than the brake lining, the shoes will be replaced or provided with new friction surfaces when sufficiently worn.

It will also be noted that the heat of friction in a brake assembly of the kind shown in Fig. 13 will be partially absorbed by and dissipated from the body of metal in the brake shoes, while such heat as may be transmitted through the brake lining to the corrugated braking flange will have no appreciable effect in distorting either the braking flange or the friction surface of the brake lining within the same, so that the area of surface contact between the braking elements is not affected by the heat of friction, and the efficiency of the brakes remains constant under all conditions. Furthermore, the increased strength of the corrugated braking flange of the drum prevents any appreciable distortion of the flange due to braking pressure applied thereto, and the corrugations increase the heat radiating surface area of the flange.

The embodiments of my invention illustrated in Figs. 1 to 12 inclusive, are especially adapted for production by the manufacturers of existing forms of brake drums without discarding the present dies or machinery used in their manufacture, or inventory of metal or finished drums, as the drums so formed by present methods may have their flanges corrugated or otherwise distorted and provided with friction linings secured thereto in one or other of the methods hereinbefore described. It is to be understood, however, that my invention is equally applicable to forms of stamped or die pressed drums, which differ more or less from existing forms. It will also be understood that any variations or inaccuracies in the drum flanges due to the "draw" of dies or inaccuracies of manufacture which may occur in the drum flange, can be compensated for by the lining, the inner face of which can always be brought into true cylindrical form coaxial with the axis of rotation of the drum. This is especially true where the lining is formed in situ in contact with the drum flange, as the lining may actually vary in thickness in different parts to enable it to conform to the irregularities of surface of the flange which it engages while the opposite friction face of the lining will be made coaxial with the axis of rotation of the drum.

While I have shown in the figures previously described the distortion of the braking flange for the purpose of increasing its rigidity as produced by a plurality of corrugations, it is to be understood that instead of distorting portions of the metal of the flange continuously, separated portions of the flange may be distorted, and these separated portions may be arranged in lines extending either transversely of the flange or circularly around the same, in which case they will be interlocked with corresponding portions of the lining and serve a further purpose of preventing relative movement between the flange and lining. Thus, in Fig. 16, for example, I have shown the flange, 204, of the drum body, 201, provided with outwardly distended projections, 205, which in this instance are arranged in circular series extending around the flange, forming in effect non-continuous distorted portions somewhat analogous to corrugations. Obviously, these separated dents may be formed so that they will extend from the outer surface of the drum inwardly, if desired, presenting a series of lines of separated depressions on the exterior of the drum. In either case when the lining 207 is in position in the drum, and formed preferably in situ therein, the lining and drum will be interlocked by means of these distorted portions so as to prevent relative movement between them, the concentric inner face of the lining being indicated at 209.

In Fig. 17 I have shown, at 301, the brake drum body provided with a braking flange, 304, having distorted portions in the form of apertures, 305, formed therein and carrying portions of the metal around each aperture, inwardly into position to interlock with the lining 307, having the concentric inner face, 309. These apertures are also shown extending in circular lines around the flange and forming non-continuous distorted portions. Obviously either the indentations shown in the preceding figure, or the apertures shown in Fig. 17 might be arranged in rows extending transversely of the flange, or in any other direction, if desired.

Fig. 18 illustrates a further modification within the scope of my invention, in which the braking flange, 404, of a drum body, 401, is given a single outward curve (transversely thereof) extending entirely around the flange between the main body and the lip, 406, which in this case is shown as bent outwardly. While I do not regard this construction as being as efficient as the parallel corrugated construction shown in other figures, it is obvious that it will reinforce the flange between the main body and lip, and in case the central portion of the arched or curved distorted portion should expand outwardly, the lining within the same would be firmly buttressed and supported at its inner and outer edges respectively, adjacent to the main body, 401, and the lip, 406.

In Fig. 19 I have shown a drum body, 501, provided with a flange, 504, having a single continuous distorted portion, in this instance bowed inwardly transversely of the flange, as at 505, and extending entirely around the flange from points adjacent to the main body and to the lip, 506.

It is to be understood that the distorted portions of the braking flange may be formed when the flange is hot or cold, as may be found most advantageous. If the drums are formed of steel and the distorted portions are formed while the flange is cold, where that is possible or convenient, an increase of strength and rigidity will be imparted to the flange due to the fact that the molecules of the metal become inequiaxed and internal stress is set up within the metal which raises its yield point or elastic limit and gradually increases its stiffness.

It is to be understood that my invention is not limited to any particular number or location of the corrugated portion or portions which may constitute one or more reinforcing ribs produced by bending the metal forming the inner and outer faces of the braking flange.

It is to be understood that my invention is equally applicable to types of brake mechanism which include external contracting shoes, or bands, but as these forms of brake mechanisms have become practically obsolete in the automotive vehicle art, I have not illustrated them herein.

What I claim and desire to secure by Letters Patent is:

1. A pressed sheet metal brake drum comprising an annular braking flange of substantially uniform thickness throughout and provided with attaching means, said braking flange having between its edges distorted portions correspondingly affecting both the inner and outer faces of the flange, and disposed in lines extending circularly around the flange to stiffen the flange, said distorted portions having perforations therein extending entirely through the flange and located at intervals around the same and an annular friction lining fitting a face of the braking flange, and having portions extending into and fitting the distorted portions of said braking flange and the perforations therein.

2. A pressed sheet metal brake drum comprising an annular braking flange of substantially uniform thickness throughout and provided with attaching means, said braking flange having between its edges distorted portions correspondingly affecting both the inner and outer faces of the flange, and disposed in lines extending circularly around the flange to stiffen the flange, said distorted portions having perforations therein extending entirely through the flange and located at intervals around the same, and an annular friction lining extending entirely around the braking flange and rigidly held with respect thereto, said lining having one face provided with portions fitting the distorted portions of a face of said braking flange and extending into the perforations therein and having an opposite friction face coaxial with the axis of rotation of the drum.

3. A pressed sheet metal brake drum comprising an annular braking flange of substantially uniform thickness throughout and provided with attaching means, said braking flange having between its edges distorted portions correspondingly affecting both the inner and outer faces of the flange, and disposed in lines extending circularly around the flange to stiffen the flange, said distorted portions having perforations therein, and inwardly projecting marginal portions surrounding said perforations, and an annular friction lining engaging the inner face of said braking flange and permanently held with respect thereto, said lining having its outer face provided with portions engaging and fitting the distorted portions of said braking flange and the inwardly projecting marginal portions surrounding said perforations, and portions extending into said perforations and having its inner face coaxial with the axis of rotation of the drum.

4. A pressed sheet metal brake drum comprising an annular braking flange of substantially uniform thickness throughout, provided at each edge with an inwardly extending flange substantially perpendicular thereto, one of said flanges being provided with attaching means for the drum, and the other of said flanges constituting a reinforcing lip, the said flange between its edges having distorted portions correspondingly affecting the inner and outer faces of the flange, and disposed in lines extending circularly around the flange coaxially with respect to the axis of rotation of the drum, to stiffen the flange, and an annular friction lining engaging the inner face of said braking flange and having its lateral edges engaging said inwardly extending flanges thereof, said lining having its outer face fitting the distorted inner face of the braking flange and its inner face coaxial with the axis of rotation of the drum, portions of said lip being bent upon adjacent lateral portions of said lining to assist in holding the lining rigidly with respect to said braking flange.

5. A pressed sheet metal brake drum comprising an annular braking flange of substantially uniform thickness throughout, provided at each edge with an inwardly extending flange substantially perpendicular thereto, one of said flanges being provided with attaching means for the drum, and the other of said flanges constituting a reinforcing lip, the said flange between its edges having distorted portions correspondingly affecting the inner and outer faces of the flange, and disposed in lines extending circularly around the flange coaxially with respect to the axis of rotation of the drum, to stiffen the flange, the said reinforcing lip being provided with distorted reinforcing portions to further stiffen the flange.

6. A pressed sheet metal drum comprising an annular braking flange of substantially uniform thickness throughout, provided at one edge with attaching means and at the other edge with an inwardly extending reinforcing lip, said braking flange having between its edges distorted portions correspondingly affecting both the inner and outer faces of said flange and disposed in lines extending circularly around the flange to stiffen it, said annular lip being provided with distorted portions correspondingly affecting the inner and outer faces thereof.

7. A pressed sheet metal drum comprising an annular braking flange of substantially uniform thickness throughout, provided at one edge with attaching means and at the other edge with an inwardly extending reinforcing lip, said braking flange having between its edges distorted portions correspondingly affecting both the inner and outer faces of said flange and disposed in lines extending circularly around the flange to stiffen it, said annular lip being provided with corrugations disposed substantially radially with respect to the axis of the drum and correspondingly affecting the inner and outer faces of said lip.

8. A pressed sheet metal drum comprising an annular braking flange of substantially uniform thickness throughout, provided at one edge with attaching means and at the other edge with an inwardly extending reinforcing lip, said braking flange having between its edges distorted portions correspondingly affecting both the inner and outer faces of said flange and disposed in lines extending circularly around the flange to stiffen it, said annular lip being provided with distorted portions correspondingly affecting the inner and outer faces thereof, and a friction lining extending entirely around said braking flange and rigidly held with respect thereto, said lining having one face engaging a face of said flange and fitting the distorted portions thereof, an edge face engaging the inner face of said lip and fitting the distorted portions and having the face opposite said flange engaging face coaxial with the axis of the drum.

9. A pressed sheet metal drum comprising an annular braking flange of substantially uniform thickness throughout, provided at one edge with attaching means and at the other edge with an inwardly extending reinforcing lip, said braking flange having between its edges distorted portions correspondingly affecting both the inner and outer faces of said flange and disposed in lines extending circularly around the flange to stiffen it, said annular lip being provided with corrugations disposed substantially radially with respect to the axis of the drum and correspondingly affecting the inner and outer faces of said lip, and a friction lining extending entirely around said braking flange and rigidly held with respect thereto, said lining having one face engaging a face of said flange and fitting the distorted portions thereof, an edge face engaging the inner face of said lip and fitting the corrugations thereof and having the face opposite the said flange engaging face coaxial with the axis of the drum.

10. The herein described pressed sheet metal brake drum constituting a mold for forming the lining in situ therein, comprising an annular braking flange having its inner face provided with distorted portions interlocking with the lining to prevent it from turning with respect to the drum and provided at its lateral edges with inwardly projecting flanges which preclude the removal of the lining from the drum without destroying the lining, and a non-metallic lining formed in situ within said brake drum as a mold.

11. The herein described pressed sheet metal brake drum constituting a mold for forming the lining in situ therein, comprising an annular braking flange provided with corrugations correspondingly affecting the inner and outer faces of the flange and adapted to interlock with the lining and prevent rotation thereof with respect to the drum, and also provided at its lateral edges with inwardly extending flanges precluding the removal of the lining without destroying it, and a non-metallic lining molded in situ in said brake drum as a mold.

12. A brake drum comprising an annular body having radial flanges and a transverse body therebetween, said transverse body being radially depressed adapted for engagement of a brake engaging member and means for fastening the parts together, and a brake engaging member fastened in said depressed transverse body of the drum, one of the radial flanges of the annular body being adapted for engagement with a vehicle member.

13. A brake drum comprising a sheet metal annular body having a vehicle member engaging flange, a transverse flange axially extending from said flange, said transverse flange being radially depressed to form means of fastening of a brake engaging member to prevent creeping thereof, and a brake engaging member of material different than the material of the said transverse flange fastened in the inner face of said transverse flange to complete the structure.

14. A brake drum comprising an annular sheet metal body having a transverse distorted flange, and a brake engaging member fastened in the inner face of said distorted flange, and means adapted to hold the parts together for preventing creeping therebetween.

15. A brake drum comprising a sheet metal portion having a radial flange adapted for engagement with a vehicle member and a transverse flange having a channel, and a brake engaging member in the inner face of said transverse flange including means adapted for fastening the parts to prevent creeping therebetween.

16. A brake drum comprising a sheet metal portion having a channeled transverse flange, a brake engaging member of material different than the said transverse flange, said brake engaging member being fastened in the inner face of said transverse flange to prevent lateral creeping therebetween, and means between the sheet metal transverse flange and brake engaging member for fastening them together to prevent circumferential creeping therebetween.

17. A brake drum comprising a sheet metal member having a radial flange adapted for engagement with a vehicle member and a channeled transverse flange adapted for engagement of a brake engaging member of material different than the material of the transverse flange to prevent lateral creeping therebetween, a brake engaging member in the inner face of said transverse flange, and means between the transverse flange and brake engaging member to prevent circumferential creeping therebetween.

18. A brake drum having a sheet metal transverse flange including a brake engaging member of material different than the material of the sheet metal fastened therein, said transverse flange being radially channeled and said brake engaging member being embedded therein to prevent lateral creeping therebetween, and means adapted for circumferential fastening of the brake engaging member in the transverse flange to prevent creeping therebetween and to provide heat dissipating means on the transverse flange.

CALEB S. BRAGG.